United States Patent
Shekokar et al.

(10) Patent No.: US 9,646,158 B1
(45) Date of Patent: May 9, 2017

(54) SYSTEMS AND METHODS FOR DETECTING MALICIOUS FILES

(71) Applicant: Symantec Corporation, Mountain View, CA (US)

(72) Inventors: Nitin Shekokar, Dhayri Gaon (IN); Xue Feng Tian, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/745,504

(22) Filed: Jun. 22, 2015

(51) Int. Cl.
G06F 21/56 (2013.01)
G06F 21/55 (2013.01)

(52) U.S. Cl.
CPC .......... G06F 21/565 (2013.01); G06F 21/552 (2013.01)

(58) Field of Classification Search
CPC .............................. G06F 21/565; G06F 21/552
See application file for complete search history.

(56) References Cited

U.S. PATENT DOCUMENTS

| 8,176,554 | B1* | 5/2012 | Kennedy | H04L 63/1416 726/23 |
| 2009/0077383 | A1* | 3/2009 | de Monseignat | H04L 63/0823 713/175 |
| 2010/0175133 | A1* | 7/2010 | Ness | G06F 21/568 726/23 |
| 2011/0083187 | A1* | 4/2011 | Malanov | G06F 21/562 726/24 |
| 2011/0247072 | A1* | 10/2011 | Staniford | H04L 63/1416 726/24 |
| 2012/0240231 | A1* | 9/2012 | Sohn | G06F 21/564 726/24 |
| 2013/0097661 | A1* | 4/2013 | Ma | H04L 63/145 726/1 |
| 2014/0344935 | A1* | 11/2014 | Duan | H04L 63/1416 726/24 |
| 2015/0058992 | A1* | 2/2015 | El-Moussa | H04L 63/145 726/24 |

OTHER PUBLICATIONS

Lanjia Wang et al., Thwarting Zero-Day Polymorphic Worms With Network-Level Length-Based Signature Generation, Feb. 2010, IEE/ACM Transactions on Networking, vol. 18, No. 1, pp. 53-62.*
Ali, et al., Dynamic Innate Immune System Model for Malware Detection, 2013 International Conference on IT Convergence and Security (ICITCS), IEEE Conference Publications, pp. 1-4.*

(Continued)

*Primary Examiner* — Luu Pham
*Assistant Examiner* — Harvey Cohen
(74) *Attorney, Agent, or Firm* — FisherBroyles LLP

(57) ABSTRACT

A computer-implemented method for detecting malicious files may include (1) identifying a length of at least one line within a textual file, (2) assessing, based at least in part on the length of the line within the textual file, a likelihood that at least a portion of the textual file has been encrypted, (3) determining, based on the likelihood that at least a portion of the textual file has been encrypted, a likelihood that the textual file is malicious, and (4) performing a remediation action based at least in part on determining the likelihood that the textual file is malicious. Various other methods, systems, and computer-readable media are also disclosed.

20 Claims, 6 Drawing Sheets

(56) References Cited

OTHER PUBLICATIONS

Tao, et al., Research on malicious links detection system based on script text analysis, 2012 14th International Conference on Advanced Communication Technology (ICACT), IEEE Conference Publications, pp. 439-442.*

Okane, et al., Malware detection: program run length against detection rate, 2014, IET Journals & Magazines, vol. 8, Issue: 1, pp. 42-51.*

Smutz, et al., Malicious PDF detection using metadata and structural features, Nov. 2012 ACSAC '12: Proceedings of the 28th Annual Computer Security Applications Conference Publisher: ACM.*

Masud, et al., Cloud-based malware detection for evolving data streams, Oct. 2008, ACM Transactions on Management Information Systems (TMIS): vol. 2 Issue 3, Oct. 2011 Publisher: ACM.*

Liao, et al., Acing the IOC Game: Toward Automatic Discovery and Analysis of Open-Source Cyber Threat Intelligence, Oct. 2016 CCS '16: Proceedings of the 2016 ACM SIGSAC Conference on Computer and Communications Security Publisher: ACM.*

* cited by examiner

SYSTEMS AND METHODS FOR DETECTING MALICIOUS FILES

BACKGROUND

Consumers and businesses increasingly rely on computers to perform both routine and specialized tasks and to store data. Consequently, malicious programmers seem to continuously increase their efforts to gain illegitimate control and access to others' computers. Computer programmers with malicious motivations have created and continue to create viruses, Trojan horses, worms, and other programs meant to compromise computer systems and data belonging to other people. These malicious programs are often referred to as malware.

Security software companies are combating the growing tide of malware by creating and deploying malware signatures to their customers on a regular basis. These malware signatures may identify key strings and/or patterns that indicate the presence of malicious code.

Unfortunately, some malware authors may implement techniques that obfuscate malicious code, thereby potentially rendering traditional scan-based techniques that rely on malware signatures ineffective. For example, some malware authors may encrypt malicious code, thereby potentially concealing the key strings and/or patterns that are characteristic of the malicious code. Accordingly, the instant disclosure identifies and addresses a need for additional and improved systems and methods for detecting malicious files.

SUMMARY

As will be described in greater detail below, the instant disclosure generally relates to systems and methods for detecting malicious files by analyzing line lengths within textual files to identify probable encryption in textual files and attributing the encryption to malicious content being hidden within the textual files.

In one example, a computer-implemented method for detecting malicious files may include (1) identifying a length of at least one line within a textual file, (2) assessing, based at least in part on the length of the line within the textual file, a likelihood that at least a portion of the textual file has been encrypted, (3) determining, based on the likelihood that at least a portion of the textual file has been encrypted, a likelihood that the textual file is malicious, and (4) performing a remediation action based at least in part on determining the likelihood that the textual file is malicious.

In one embodiment, assessing, based at least in part on the length of the line within the textual file, the likelihood that at least a portion of the textual file has been encrypted may include: determining a proportion of the length of the line to a length of the textual file and attributing a monotonic relationship between the proportion of the length of the line to the length of the textual file and the likelihood that at least a portion of the textual file has been encrypted.

In one embodiment, assessing, based at least in part on the length of the line within the textual file, the likelihood that at least a portion of the textual file has been encrypted may include: determining a number of lines within the textual file that are of the same length as the length of the line and attributing a monotonic relationship between the number of lines within the textual file that are of the same length as the length of the line and the likelihood that at least a portion of the textual file has been encrypted.

In some examples, determining the number of lines within the textual file that are of the same length as the length of the line may include determining a number of consecutive lines within the textual file that are of the same length as the length of the line.

In some examples, attributing the monotonic relationship between the number of lines within the textual file that are of the same length as the length of the line and the likelihood that at least a portion of the textual file has been encrypted may include: determining a proportion of the number of lines within the textual file that are of the same length as the length of the line to a total number of lines within the textual file and attributing a monotonic relationship between the proportion of the number of lines within the textual file that are of the same length as the length of the line to the total number of lines within the textual file and the likelihood that at least a portion of the textual file has been encrypted.

In some examples, identifying the length of the line within the textual file may include identifying a length of a string within the textual file unbroken by a delimiter of a predetermined type. In one embodiment, the predetermined type may include a line-breaking delimiter. In one embodiment, the textual file may include a script file.

In one embodiment, assessing, based at least in part on the length of the line within the textual file, the likelihood that at least a portion of the textual file has been encrypted may include determining, based at least in part on the length of the line within the textual file, the likelihood that malicious code within the textual file has been encrypted.

In one embodiment, assessing, based at least in part on the length of the line within the textual file, the likelihood that at least a portion of the textual file has been encrypted may include determining the likelihood that at least a portion of the textual file has been encrypted without calculating an entropy of the textual file.

In one embodiment, a system for implementing the above-described method may include (1) an identification module, stored in memory, that identifies a length of at least one line within a textual file, (2) an assessment module, stored in memory, that assesses, based at least in part on the length of the line within the textual file, a likelihood that at least a portion of the textual file has been encrypted, (3) a determination module, stored in memory, that determines, based on the likelihood that at least a portion of the textual file has been encrypted, a likelihood that the textual file is malicious, (4) a performing module, stored in memory, that performs a remediation action based at least in part on determining the likelihood that the textual file is malicious, and (5) at least one physical processor configured to execute the identification module, the assessment module, the determination module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a length of at least one line within a textual file, (2) assess, based at least in part on the length of the line within the textual file, a likelihood that at least a portion of the textual file has been encrypted, (3) determine, based on the likelihood that at least a portion of the textual file has been encrypted, a likelihood that the textual file is malicious, and (4) perform a remediation action based at least in part on determining the likelihood that the textual file is malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
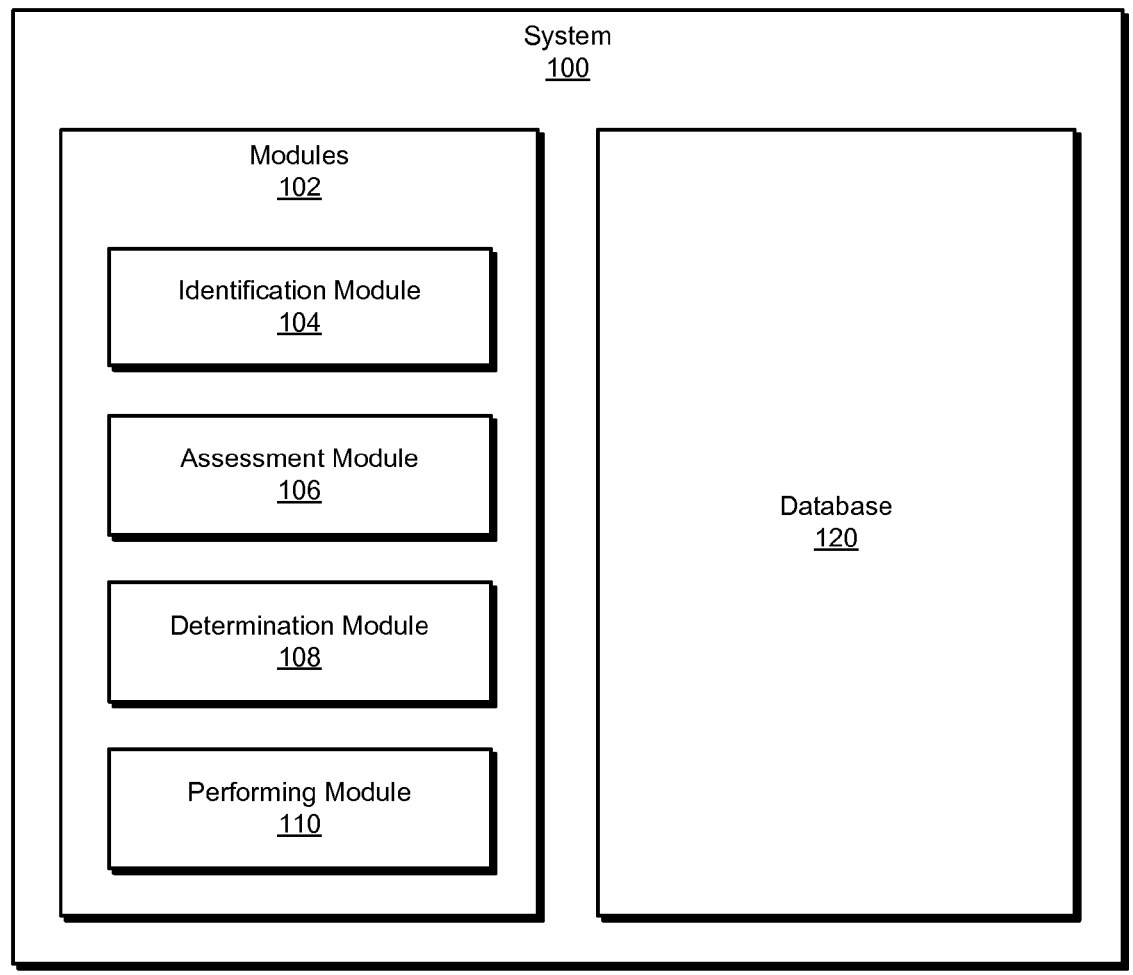
FIG. 1 is a block diagram of an exemplary system for detecting malicious files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malicious files. As will be explained in greater detail below, by analyzing line lengths within textual files to identify probable encryption in textual files and attributing the encryption to malicious content being hidden within the textual files, the systems and methods described herein may detect malicious files even when key content that makes the files malicious is obscured. Furthermore, these systems and methods may effectively identify encryption in executable files (such as script files) that are not Portable Executable files by identifying encrypted content without relying solely on indicators (such as entropy) that may be unreliable for identifying encryption in certain types of files.

Figure 2:
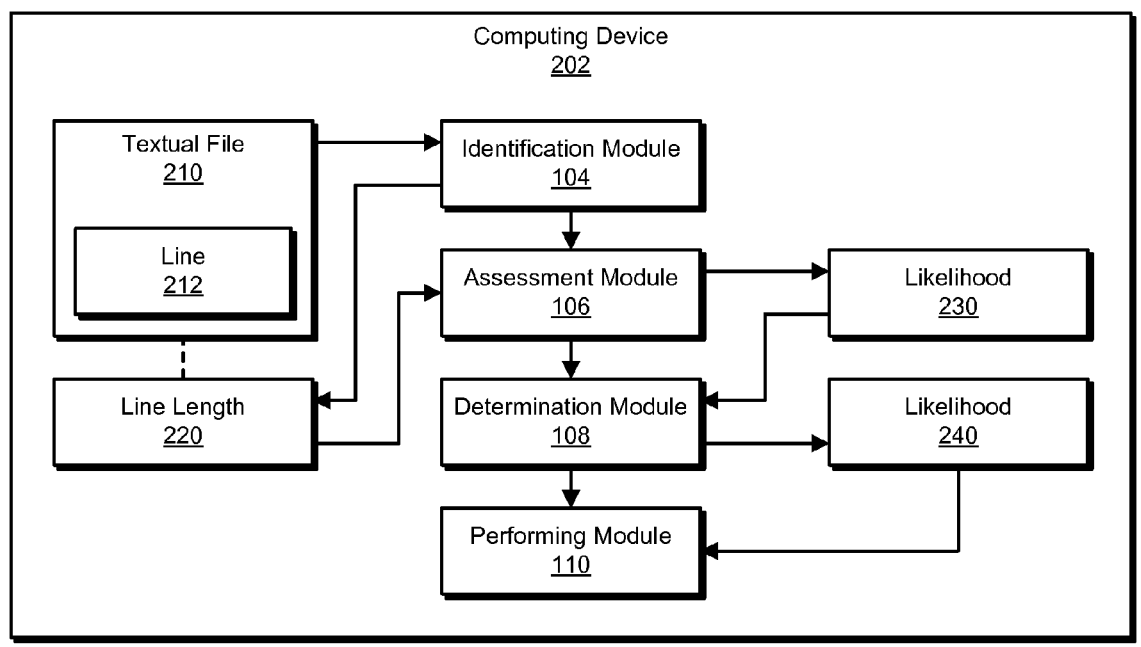
FIG. 2 is a block diagram of an additional exemplary system for detecting malicious files.

The following will provide, with reference to FIGS. 1-2, detailed descriptions of exemplary systems for detecting malicious files. Detailed descriptions of corresponding computer-implemented methods will also be provided in connection with FIG. 3. Detailed descriptions of exemplary textual files will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for detecting malicious files. As illustrated in this figure, exemplary system 100 may include one or more modules 102 for performing one or more tasks. For example, and as will be explained in greater detail below, exemplary system 100 may also include an identification module 104 that may identify a length of at least one line within a textual file. Exemplary system 100 may additionally include an assessment module 106 that may assess, based at least in part on the length of the line within the textual file, a likelihood that at least a portion of the textual file has been encrypted. Exemplary system 100 may also include a determination module 108 that may determine, based on the likelihood that at least a portion of the textual file has been encrypted, a likelihood that the textual file may be malicious. Exemplary system 100 may additionally include a performing module 110 that may perform a remediation action based at least in part on determining the likelihood that the textual file may be malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more files, including, e.g., a textual file.

Database 120 may represent portions of a single database or computing device or a plurality of databases or computing devices. For example, database 120 may represent a portion of computing device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102 and/or may store all or a portion of the data in database 120.

In one embodiment, one or more of modules 102 from FIG. 1 may, when executed by at least one processor of computing device 202, enable computing device 202 to detect malicious files. For example, and as will be described in greater detail below, one or more of modules 102 may cause computing device 202 to detect malicious files. For example, and as will be described in greater detail below, identification module 104 may identify a length 220 of at least one line 212 within a textual file 210. Assessment module 106 may assess, based at least in part on length 220 of line 212 within textual file 210, a likelihood 230 that at least a portion of textual file 210 has been encrypted. Determination module 108 may determine, based on likelihood 230 that at least a portion of textual file 210 has been encrypted, a likelihood 240 that textual file 210 is malicious.

Performing module 110 may perform a remediation action based at least in part on determining likelihood 240 that textual file 210 is malicious.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Figure 3:
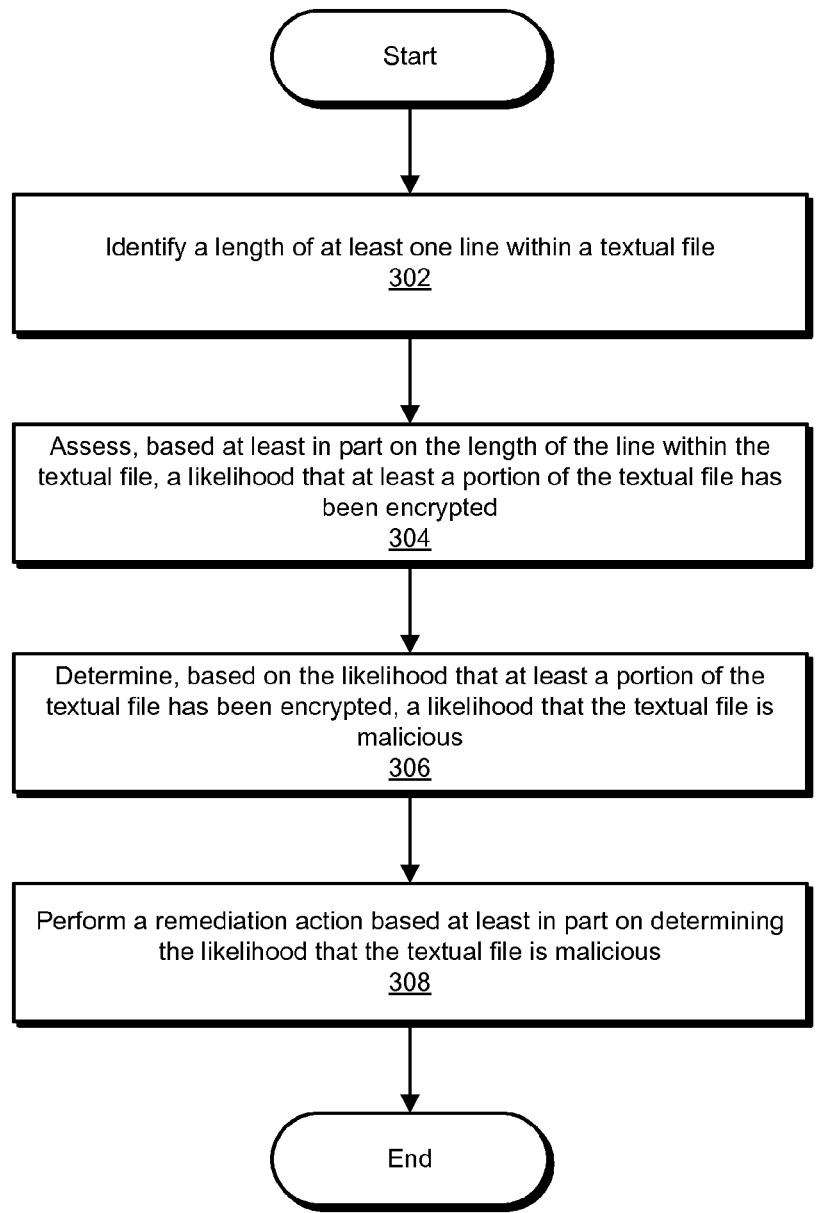
FIG. 3 is a flow diagram of an exemplary method for detecting malicious files.

FIG. 3 is a flow diagram of an exemplary computer-implemented method 300 for detecting malicious files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify a length of at least one line within a textual file. For example, identification module 104 may, as part of computing device 202 in FIG. 2, identify length 220 of at least one line 212 within textual file 210.

As used herein, the term "textual file" may refer to any file and/or data object that stores data in a text-based format. For example, the term "textual file" may refer to a file that stores plain text. In some examples, the term "textual file" may refer to a script file (e.g., a JAVASCRIPT file or a VBSCRIPT file) and/or a file including high-level and/or interpreted code. For example, the textual file may include computer instructions in the form of source code that is parsed and interpreted for execution without the creation of an intermediate machine-readable executable file. Thus, the textual file may include executable instructions that are not in a Portable Executable format. In some examples, the term "textual file" may refer to a file stored in a line-delimited format.

As used herein, the term "line" may refer to any sequence of textual data that is internally unbroken by a delimiter that is specified for the format of the textual data. Thus, identification module 104 may identify the length of the line within the textual file by identifying a length of a string of characters within the textual file unbroken by a delimiter of a predetermined type. In some examples, the predetermined type may include a line-breaking delimiter (e.g., an end-of-line character and/or an end-of file character). In some examples, identification module 104 may exclude one or more delimiting characters in a character count for ascertaining the length of the string of characters. For example, identification module 104 may exclude a line-breaking character, trailing whitespace characters, and/or encapsulating punctuation characters (e.g., brackets, braces, and/or parentheses) used to offset a body of textual data.

Identification module 104 may identify the length of the line within the textual file in any of a variety of contexts. For example, identification module 104 may identify the textual file as subject to a security assessment. Identification module 104 may identify the textual file as subject to a security assessment in any of a variety of contexts. For example, identification module 104 may identify the textual file stored on a computing device that is subject to security scans. Additionally or alternatively, identification module 104 may identify the textual file in transit on a computing network, where the network traffic is subject to security scans. In some examples, identification module 104 may identify an attempt, intercepted and/or observed by a security system, to open and/or execute the textual file. In some examples, identification module 104 may identify one or more suspicious behaviors connected with the textual file. Additionally or alternatively, identification module 104 may determine that the textual file is connected and/or correlated with an untrusted source. In some examples, identification module 104 may identify the textual file as lacking a current entry in a security database.

Identification module 104 may identify the length of the line within the textual file in any suitable manner. For example, identification module 104 may parse the textual file and count the number of characters in each line of the textual file. Additionally or alternatively, identification module 104 may identify metadata that provides the length of the line. In some examples, identification module 104 may identify an approximate length of the line. For example, identification module 104 may determine that the length of the line exceeds a predetermined number of characters (e.g., 255 characters) or that the length of the line exceeds a proportion of the total size of the textual file (e.g., the line constitutes more than half of the textual file). In some examples, identification module 104 may identify the length of each line of the textual file separately. In some examples, identification module 104 may identify patterns of line lengths in the textual file. For example, identification module 104 may count the number of consecutive lines within the textual file that have the same length and/or approximately the same length.

Figure 4:
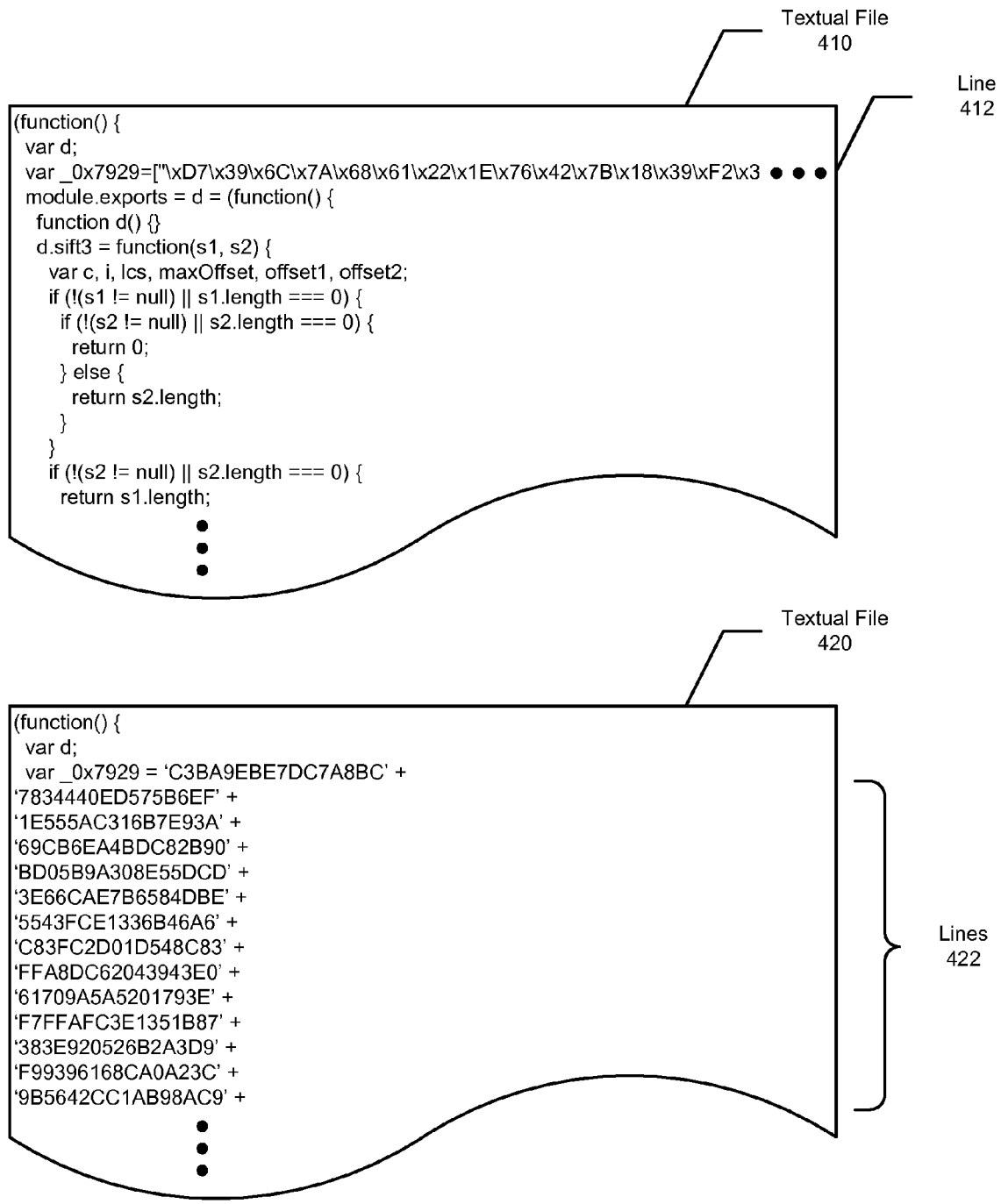
FIG. 4 is an illustration of exemplary textual files.

To provide an example of textual files, FIG. 4 illustrates textual files 410 and 420. As shown in FIG. 4, textual files 410 and 420 may include line-delimited textual data. Textual file 410 may include a line 412. In one example, the line 412 may represent the longest line in textual file 410. For example, line 412 may include approximately 12,000 characters while textual file 410 may include a total of approximately 14,000. Accordingly, in one example identification module 104 may identify the length of line 412. In addition, identification module 104 may identify the total length of textual file 410 and/or the length of one or more additional lines in textual file 410. Textual file 420 may include lines 422. As shown in the illustration of textual file 420, lines 422 may represent consecutive lines within textual file 420 that have the same number of characters per line (e.g., 20 characters, including punctuation and whitespace characters but not including line-delimiting characters). In some examples, identification module 104 may identify the length of each of lines 422 (e.g., 20 characters). In addition, identification module 104 may determine that lines 422 are consecutive lines of the same length and count lines 422 to determine a number of consecutive lines of the same length within textual file 420. In some examples, identification module 104 may, furthermore, determine the total number of lines in textual file 420. In some examples, as will be described in greater detail below, line 412 in textual file 410 and lines 422 in textual file 420 may represent encrypted data (e.g., used to obfuscate potentially malicious instructions within textual files 410 and 420).

Returning to FIG. 3, at step 304, one or more of the systems described herein may assess, based at least in part on the length of the line within the textual file, a likelihood that at least a portion of the textual file has been encrypted. For example, assessment module 106 may, as part of computing device 202 in FIG. 2, assess, based at least in part on length 220 of line 212 within textual file 210, likelihood 230 that at least a portion of textual file 210 has been encrypted.

As used herein, the term "encryption" (with reference to related terms such as "encrypted") may refer to any process for encoding information to prevent unintended access to the information while allowing the information to be stored. For example, a malicious programmer may encrypt malicious computer-executable instructions within a script file to facilitate the distribution of the malicious computer-executable instructions while preventing a security system from reading and/or evaluating the malicious computer-executable instructions (e.g., to prevent the security system from taking a security action against the script file). In some examples, the malicious programmer may include and/or provide a key and/or decryption process for the script file and/or one or more additional executable elements to decrypt the malicious computer-executable instructions so that a computing system may execute the malicious computer-executable instructions. In some examples, the term "encryption" may refer to encoding information by applying a cryptographic function (with, e.g., a cryptographic key) to the information. Additionally or alternatively, the term "encryption" may refer to applying a cipher and/or an obfuscation procedure to information to be encoded. In some examples, the term "encryption" may refer to a procedure that includes compression of information.

Assessment module 106 may assess, based at least in part on the length of the line within the textual file, the likelihood that at least a portion of the textual file has been encrypted in any of a variety of ways. For example, assessment module 106 may assess the likelihood that at least a portion of the textual file has been encrypted by (1) determining a proportion of the length of the line to a length of the textual file and (2) attributing a monotonic relationship between the proportion of the length of the line to the length of the textual file and the likelihood that at least a portion of the textual file has been encrypted. For example, assessment module 106 may assign a relatively higher likelihood of encryption to a textual file with a line that is long in proportion to the total length of the file and may assign a relatively lower likelihood of encryption to a textual file whose longest line is relatively short in proportion to the total length of the file. For example, assessment module 106 may determine that the line likely includes encrypted content because the line is long. In one example, assessment module 106 may calculate a score indicating the likelihood of encryption based on a formula expressing a proportion of the textual file that is consumed by the longest line. For example, assessment module 106 may use the following formula: (longest_line_length/file_size)*100. In this example, a score approaching 0 would lend little weight to the conclusion that the textual file contains encrypted content, while a score approaching 100 would lend greater weight to the conclusion that the textual file contains encrypted content. Using FIG. 4 as an example, assessment module 106 may determine that textual file 410 likely includes encrypted content due to the length of line 412 in proportion to the total size of textual file 410.

In one embodiment, assessment module 106 may assess the likelihood that at least a portion of the textual file has been encrypted by (1) determining a number of lines within the textual file that are of the same length as the length of the line and (2) attributing a monotonic relationship between the number of lines within the textual file that are of the same length as the length of the line and the likelihood that at least a portion of the textual file has been encrypted. For example, assessment module 106 may assign a relatively higher likelihood of encryption to a textual file with many consecutive lines of the same length and may assign a relatively lower likelihood of encryption to a textual file that has few consecutive lines of the same length. For example, assessment module 106 may determine that it is likely that a consecutive series of lines include encrypted content because the lines are of the same length (and, e.g., because the number of consecutive lines of the same length is high).

In some examples, assessment module 106 may attribute the monotonic relationship between the number of lines within the textual file that are of the same length as the length of the line and the likelihood that at least a portion of the textual file has been encrypted by (1) determining the proportion of the number of lines within the textual file that are of the same length as the length of the line to the total number of lines within the textual file and (2) attributing a monotonic relationship between the proportion of the number of lines within the textual file that are of the same length as the length of the line to the total number of lines within the textual file and the likelihood that at least a portion of the textual file has been encrypted. For example, assessment module 106 may assign a relatively higher likelihood of encryption to a textual file with many consecutive lines of the same length in proportion to the total number of lines in the file and may assign a relatively lower likelihood of encryption to a textual file that has few consecutive lines of the same length in proportion to the total number of lines in the file. For example, assessment module 106 may determine that it is likely that a consecutive series of lines include encrypted content because the lines are of the same length (and, e.g., because the number of consecutive lines of the same length is high in proportion to the total number of lines in the textual file). In one example, assessment module 106 may calculate a score indicating the likelihood of encryption based on a formula expressing a proportion of lines in the textual file that are consecutive lines of the same length. For example, assessment module 106 may use the following formula: (number_of_consecutive_lines_of_same_length/total_number_of_lines)*100. In this example, a score approaching 0 would lend little weight to the conclusion that the textual file contains encrypted content, while a score approaching 100 would lend greater weight to the conclusion that the textual file contains encrypted content. Using FIG. 4 as an example, assessment module 106 may determine that textual file 420 likely includes encrypted content due to the number of consecutive lines 422 of the same length in proportion to the total number of lines in textual file 420.

In one example, assessment module 106 may consider both the length of the longest line in the textual file and the number of consecutive lines of the same length in the textual file. For example, assessment module 106 may use the following formula: ((longest_line_length/file_size)*100+(number_of_consecutive_lines_of_same_length/total_number_of_lines)*100)/2. In this example, a score approaching 0 would lend little weight to the conclusion that the textual file contains encrypted content, while a score approaching 100 would lend greater weight to the conclusion that the textual file contains encrypted content.

In some examples, assessment module 106 may calculate a score to represent the likelihood that the textual file includes encrypted content. Additionally or alternatively, assessment module 106 may determine that proportionate length of the longest line in the textual file and/or the proportionate number of consecutive lines of the same length in the textual file exceeds a predetermined threshold and may therefore classify the textual file as including encrypted content.

In some examples, assessment module 106 may assess, based at least in part on the length of the line, the likelihood that at least a portion of the textual file has been encrypted by determining, based at least in part on the length of the line within the textual file, the likelihood that malicious code within the textual file has been encrypted. For example, assessment module 106 may attribute a long line within a textual file to that line including a large amount of encrypted content. Likewise, assessment module 106 may attribute the existence of a large number of consecutive lines with the same length to those lines including encrypted content (e.g., because the consecutive lines were generated to each store a regularized chunk of encrypted data).

In some examples, assessment module 106 may assess the likelihood that at least a portion of the textual file has been encrypted without calculating an entropy of the textual file. For example, assessment module 106 may rely on the lengths of one or more lines in the textual file, the size of the textual file, and/or the total number of lines in the textual file without examining the content of the lines in the textual file to determine whether the entropy of the information stored by the textual file indicates encryption and/or maliciousness. Alternatively, assessment module 106 may calculate only the entropy of lines suspected to be encrypted based on the lengths of the lines and use the entropy of only the suspect lines to determine whether the suspect lines include encrypted content. For example, assessment module 106 may suspect that a long line includes encrypted content due to its length and then calculate the entropy of the content of the long line. If the entropy is high, assessment module 106 may revise the assessed probability that the long line is encrypted upward. If the entropy is low, assessment module 106 may revise the assessed probability downward. Likewise, assessment module 106 may suspect that a consecutive series of lines of the same length include encrypted content and then calculate the entropy of the content of the consecutive series of lines. If the entropy is high, assessment module 106 may revise the assessed probability that the long line is encrypted upward. In some examples, assessment module 106 may base the assessment of the likelihood that the textual file includes encrypted content on one or more line lengths instead of (or in addition to) the entropy of the textual file based on an attribute of the textual file. For example, assessment module 106 may include line length information and/or exclude entropy calculations from assessment of the likelihood that the textual file includes encrypted content based on determining that the textual file is a textual file and/or based on determining that the textual file is not a Portable Executable file. For example, an entropy calculation alone may be more effective at identifying encrypted content in a Portable Executable file than at identifying encrypted content in a script file.

At step 306, one or more of the systems described herein may determine, based on the likelihood that at least a portion of the textual file has been encrypted, a likelihood that the textual file is malicious. For example, determination module 108 may, as part of computing device 202 in FIG. 2, determine, based on likelihood 230 that at least a portion of textual file 210 has been encrypted, likelihood 240 that textual file 210 is malicious.

Determination module 108 may determine a likelihood that the textual file is malicious based on the likelihood that at least a portion of the textual file has been encrypted in any suitable manner. For example, determination module 108 may attribute a monotonic relationship between the likelihood that at least a portion of the textual file has been encrypted and the likelihood that the textual file is malicious.

For example, determination module 108 may suspect presumed encrypted content as concealing malicious content.

In some examples, determination module 108 may consider multiple factors to determine the likelihood that the textual file is malicious. For example, determination module 108 may consider the source of the textual file, behaviors observed in connection with the textual file, other files associated with the textual file, a community-generated reputation for the textual file, and/or content of the textual file. In some examples, determination module 108 may evaluate whether the textual file and/or another program has the potential to load an unencrypted version of the potentially encrypted content in the textual file (e.g., the one or more lines of the textual file that led to a determination that the textual file contains or likely contains encrypted content).

At step 308, one or more of the systems described herein may perform a remediation action based at least in part on determining the likelihood that the textual file is malicious. For example, performing module 110 may, as part of computing device 202 in FIG. 2, perform a remediation action based at least in part on determining likelihood 240 that textual file 210 is malicious.

Performing module 110 may perform any of a variety of remediation actions. For example, performing module 110 may delete the textual file, quarantine the textual file, sandbox the textual file, prevent a transfer of the textual file, and/or block the loading and/or execution of the textual file. Additionally or alternatively, performing module 110 may warn a user and/or administrator about the textual file. In one example, performing module 110 may record the textual file as untrusted and/or malicious in a security database. For example, performing module 110 may create a signature of the textual file (e.g., for distribution to end-client security systems so that the end-client security systems can identify the textual file as malicious). In one example, performing module 110 may create an anti-malware signature of the textual file based on encrypted portions of the textual file (e.g., on the determination that the encrypted portions of the textual file are malicious). Additionally or alternatively, performing may create an anti-malware signature of the textual file based on unencrypted portions of the textual file and excluding the portions of the textual file determined to include encrypted content (e.g., to allow a match between the signature and a variant of the textual file that is encrypted with a different encryption key and/or configuration).

In some examples, performing module 110 may perform a remediation action by preventing access to the encrypted content (e.g., the one or more lines of the textual file that led to a determination that the textual file contains or likely contains encrypted content) when the textual file is in execution via an interpreter. For example, performing module 110 may cause an attempted access of the encrypted content to cause an exception. In some examples, performing module 110 may capture state information when an interpreter attempts to access the encrypted portion of the textual file and provide the state information to a security vendor for further analysis.

As explained above in connection with method 300 in FIG. 3, encryption may be a useful attribute among heuristics for detecting malicious files. To utilize encryption as an attribute, the systems and methods described herein may measure the encryption in a non-Portable-Executable file. For example, the systems and methods described herein may determine that the encrypted part of a file may be written in a single line, which may cause the line to be long and to cover a large percentage of the file. Additionally or alternatively, the systems and methods described herein may determine that the encrypted part of a file may be written in a pattern of several lines with the same line length. Accordingly, in one example, the systems and methods may calculate the likelihood and/or extent of encryption in a file based on the following formula: ((longest_line_length/file_size)*100+(number_of_consecutive_lines_of_same_length/total_number_of_lines)*100)/2. In this example, a score approaching 0 would lend little weight to the conclusion that the file contains encrypted content and/or would indicate that the file contains little encrypted content, while a score approaching 100 would lend greater weight to the conclusion that the file contains encrypted content and/or would indicate that the file contains a larger amount of encrypted content.

Figure 5:
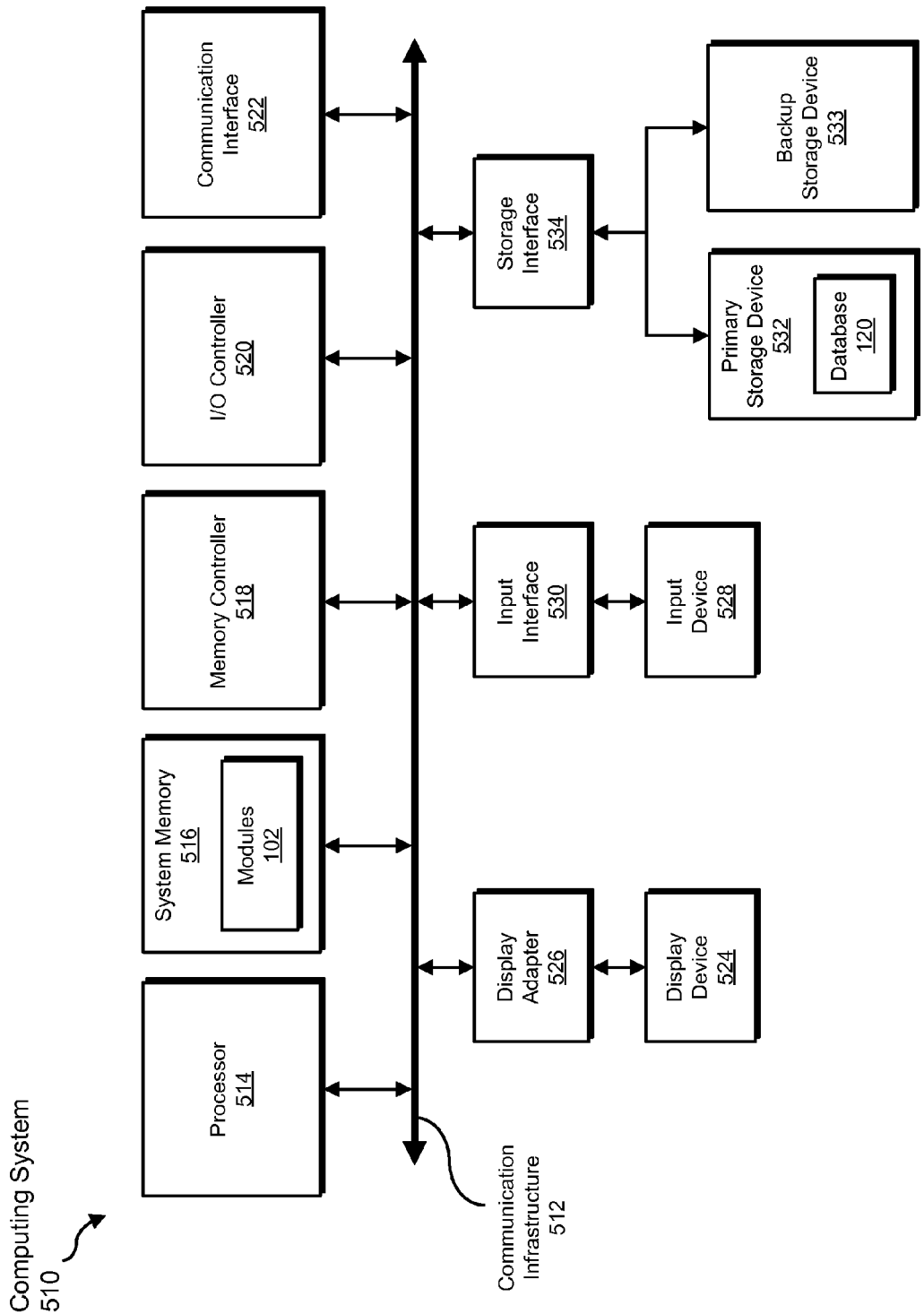
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
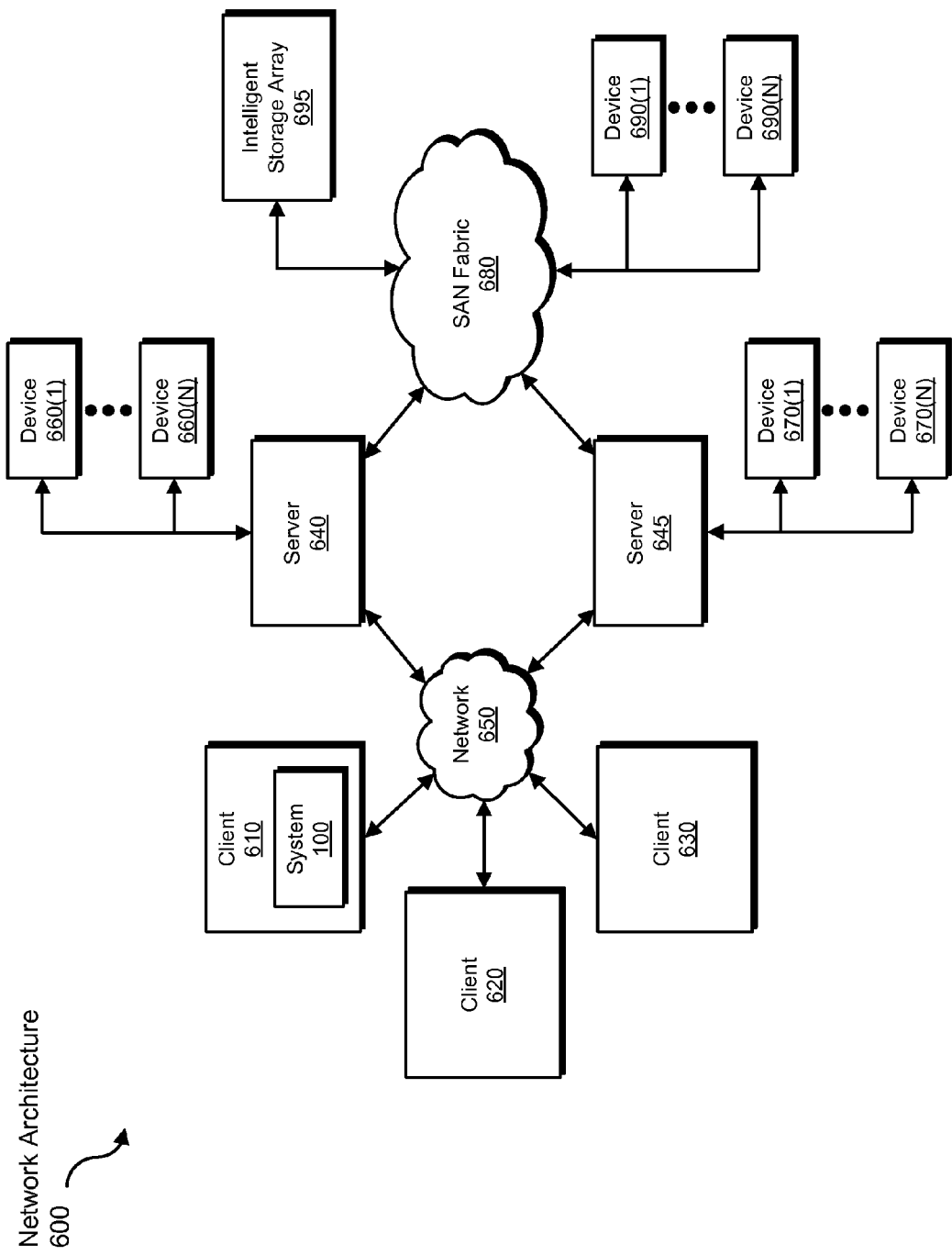
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting malicious files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a textual file to be transformed, transform the textual file, output a result of the transformation to a security system, use the result of the transformation to detect that the textual file is a malicious file, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious files, at least a portion of the method being performed by a computing device comprising at least one processor, the method comprising:
    identifying a length of at least one line within a textual file;
    determining, based at least in part on the length of the line within the textual file, a likelihood that at least a portion of the textual file has been encrypted, wherein the determining comprises:
    determining a number of lines within the textual file that are of the same length as the length of the line; and
    determining the likelihood that at least a portion of the textual file has been encrypted based on the number of lines within the textual file that are of the same length as the length of the line;
    determining, based on the likelihood that at least a portion of the textual file has been encrypted, a likelihood that the textual file is malicious; and
    performing a remediation action based at least in part on determining the likelihood that the textual file is malicious.

2. The computer-implemented method of claim 1, wherein determining, based at least in part on the length of the line within the textual file, the likelihood that at least a portion of the textual file has been encrypted comprises:
    determining a proportion of the length of the line to a length of the textual file.

3. The computer-implemented method of claim 1, wherein determining the number of lines within the textual file that are of the same length as the length of the line comprises determining a number of consecutive lines within the textual file that are of the same length as the length of the line.

4. The computer-implemented method of claim 1, wherein determining the number of lines within the textual file that are of the same length as the length of the line and the likelihood that at least a portion of the textual file has been encrypted comprises determining a proportion of the number of lines within the textual file that are of the same length as the length of the line to a total number of lines within the textual file.

5. The computer-implemented method of claim 1, wherein identifying the length of the line within the textual file comprises identifying a length of a string within the textual file unbroken by a delimiter of a predetermined type.

6. The computer-implemented method of claim 5, wherein the predetermined type comprises a line-breaking delimiter.

7. The computer-implemented method of claim 1, wherein the textual file comprises a script file.

8. The computer-implemented method of claim 1, wherein determining, based at least in part on the length of the line within the textual file, the likelihood that at least a portion of the textual file has been encrypted comprises determining, based at least in part on the length of the line within the textual file, the likelihood that malicious code within the textual file has been encrypted.

9. The computer-implemented method of claim 1, wherein determining, based at least in part on the length of the line within the textual file, the likelihood that at least a portion of the textual file has been encrypted comprises determining the likelihood that at least a portion of the textual file has been encrypted without calculating an entropy of the textual file.

10. A system for detecting malicious files, the system comprising:
- at least one physical processor, and a memory for storing instructions, configured for the at least one physical processor to execute:
- an identification module, that identifies a length of at least one line within a textual file;
- an assessment module, that determines, based at least in part on the length of the line within the textual file, a likelihood that at least a portion of the textual file has been encrypted, wherein the determining comprises:
  - determining a number of lines within the textual file that are of the same length as the length of the line; and
  - determining the likelihood that at least a portion of the textual file has been encrypted based on the number of lines within the textual file that are of the same length as the length of the line;
- a determination module, that determines, based on the likelihood that at least a portion of the textual file has been encrypted, a likelihood that the textual file is malicious; and
- a performing module, that performs a remediation action based at least in part on determining the likelihood that the textual file is malicious.

11. The system of claim 10, wherein the assessment module determines, based at least in part on the length of the line within the textual file, the likelihood that at least a portion of the textual file has been encrypted by:
- determining a proportion of the length of the line to a length of the textual file.

12. The system of claim 10, wherein the assessment module determines the number of lines within the textual file that are of the same length as the length of the line by determining a number of consecutive lines within the textual file that are of the same length as the length of the line.

13. The system of claim 10, wherein the assessment module determines the number of lines within the textual file that are of the same length as the length of the line and the likelihood that at least a portion of the textual file has been encrypted by determining a proportion of the number of lines within the textual file that are of the same length as the length of the line to a total number of lines within the textual file.

14. The system of claim 10, wherein the identification module identifies the length of the line within the textual file by identifying a length of a string within the textual file unbroken by a delimiter of a predetermined type.

15. The system of claim 14, wherein the predetermined type comprises a line-breaking delimiter.

16. The system of claim 10, wherein the textual file comprises a script file.

17. The system of claim 10, wherein the assessment module determines, based at least in part on the length of the line within the textual file, the likelihood that at least a portion of the textual file has been encrypted by determining, based at least in part on the length of the line within the textual file, the likelihood that malicious code within the textual file has been encrypted.

18. A non-transitory computer-readable medium comprising one or more computer-readable instructions that, when executed by at least one processor of a computing device, cause the computing device to:
- identify a length of at least one line within a textual file;
- determine, based at least in part on the length of the line within the textual file, a likelihood that at least a portion of the textual file has been encrypted, wherein the determining comprises:
  - determining a number of lines within the textual file that are of the same length as the length of the line; and
  - determining the likelihood that at least a portion of the textual file has been encrypted based on the number of lines within the textual file that are of the same length as the length of the line;
- determine, based on the likelihood that at least a portion of the textual file has been encrypted, a likelihood that the textual file is malicious; and
- perform a remediation action based at least in part on determining the likelihood that the textual file is malicious.

19. The non-transitory computer-readable medium of claim 18, wherein determining, based at least in part on the length of the line within the textual file, the likelihood that at least a portion of the textual file has been encrypted comprises:
- determining a proportion of the length of the line to a length of the textual file.

20. The non-transitory computer-readable medium of claim 18, wherein determining, based at least in part on the length of the line within the textual file, the likelihood that at least a portion of the textual file has been encrypted comprises determining, based at least in part on the length of the line within the textual file, the likelihood that malicious code within the textual file has been encrypted.

* * * * *